(12) United States Patent
Parker

(10) Patent No.: US 7,475,513 B2
(45) Date of Patent: Jan. 13, 2009

(54) NON-PENETRATING SEISMIC ROOF SUPPORT

(76) Inventor: Philip A. Parker, 715 FM 2888, Naples, TX (US) 75568

( * ) Notice: Subject to any disclaimer, the term of this patent is extended or adjusted under 35 U.S.C. 154(b) by 490 days.

(21) Appl. No.: 11/110,022

(22) Filed: Apr. 18, 2005

(65) Prior Publication Data
US 2005/0241240 A1 Nov. 3, 2005

Related U.S. Application Data

(60) Provisional application No. 60/567,410, filed on Apr. 29, 2004.

(51) Int. Cl.
*E04D 13/00* (2006.01)
*F16L 3/00* (2006.01)
*F16L 3/08* (2006.01)

(52) U.S. Cl. .................. 52/27; 248/70; 248/49

(58) Field of Classification Search ............ 52/27, 52/219, 58; 248/49, 70, 405, 406.1
See application file for complete search history.

(56) References Cited

U.S. PATENT DOCUMENTS

| 5,873,201 A * | 2/1999 | Fey ................... 52/27 |
| 6,502,791 B2 * | 1/2003 | Parker ............. 248/70 |
| 6,526,701 B2 * | 3/2003 | Stearns et al. ...... 52/24 |

\* cited by examiner

*Primary Examiner*—Brian Glessner
*Assistant Examiner*—Adriana Figueroa
(74) *Attorney, Agent, or Firm*—Slater & Matsil, L.L.P.

(57) ABSTRACT

A non-penetrating seismic roof support that provides for a solid platform for the attachment of various pipe and equipment support devices with a positive means to secure both the support and the supported piping system or equipment to a building's structure in a fashion that further enables the support to be readily flashed to the roof's moisture proof membrane in order to prevent potential leakage of water into the building's interior.

13 Claims, 7 Drawing Sheets

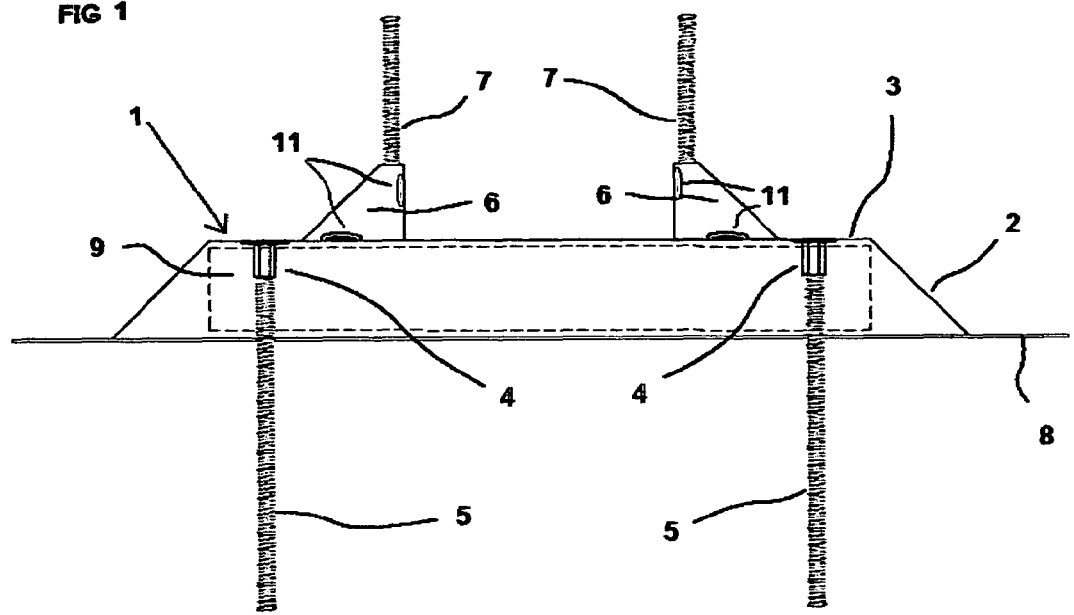
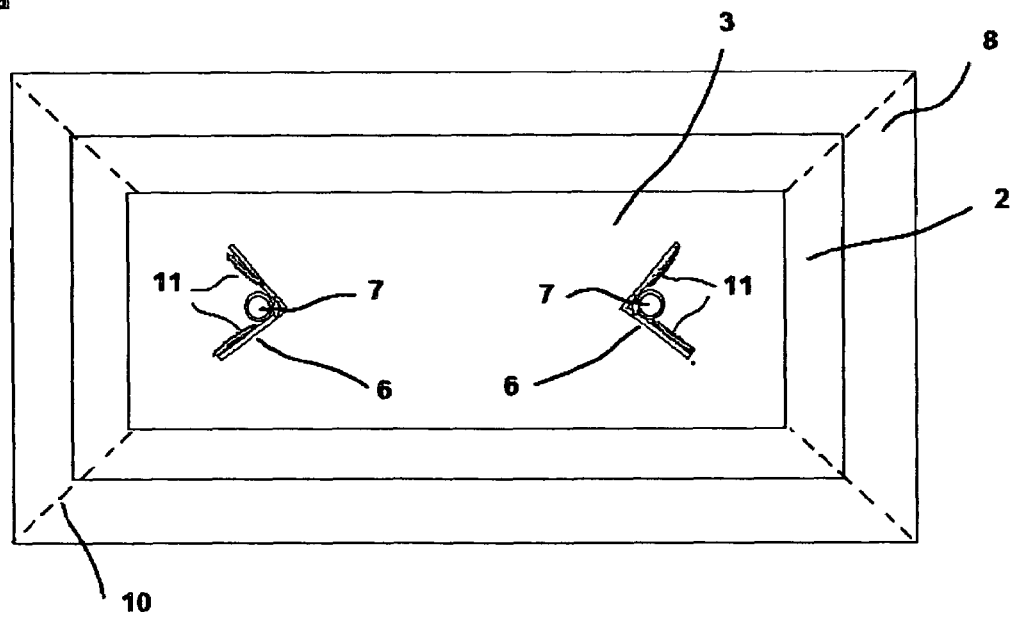

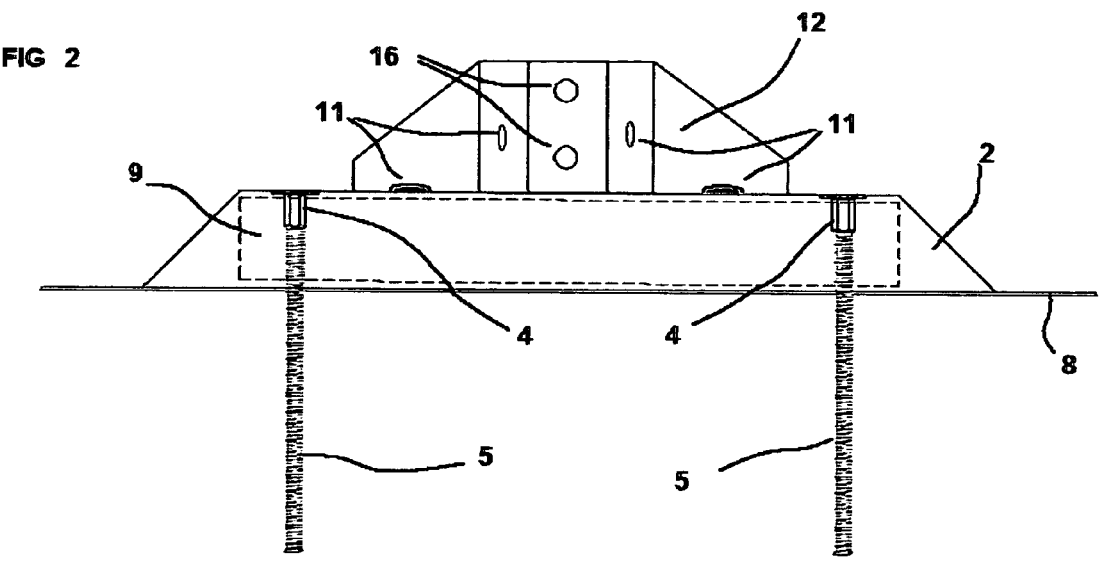
FIG 2
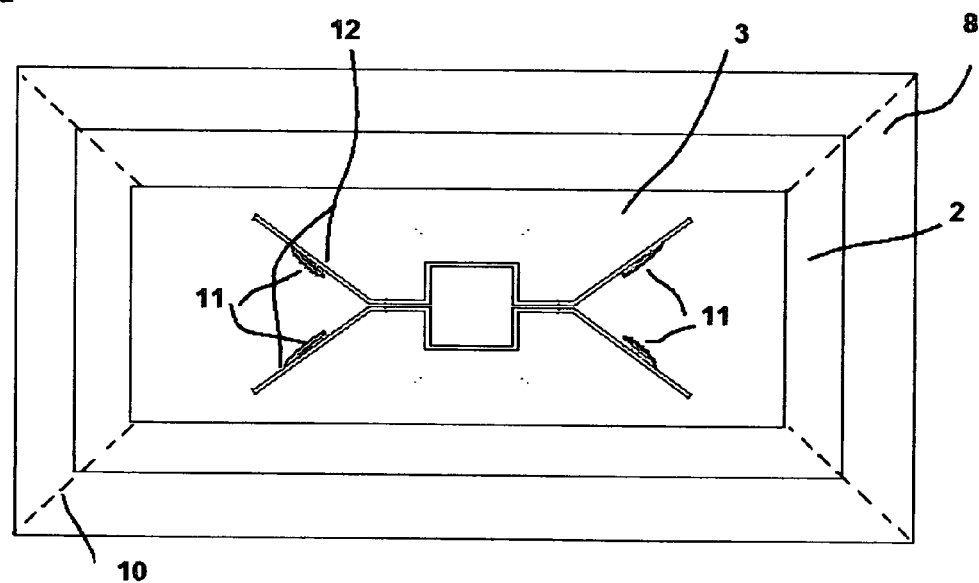
FIG 2-a

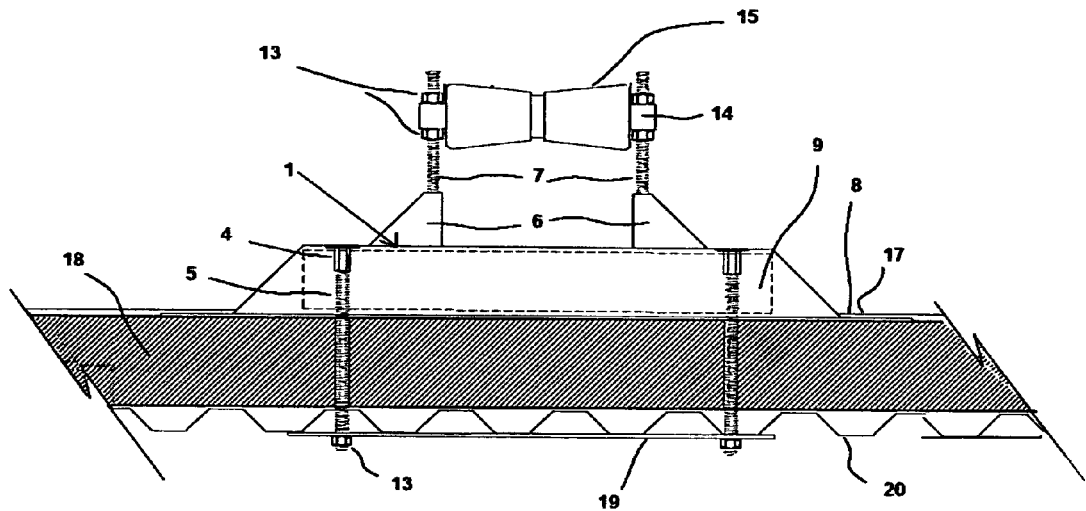
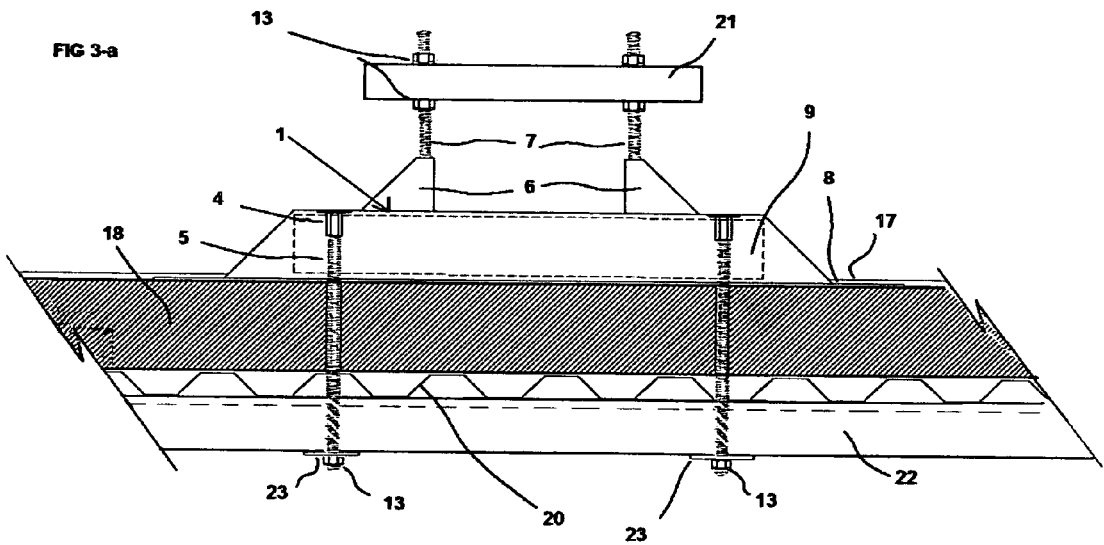

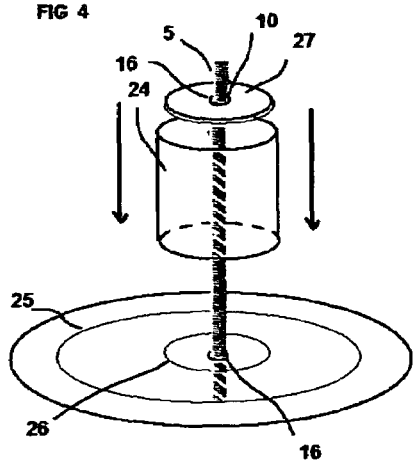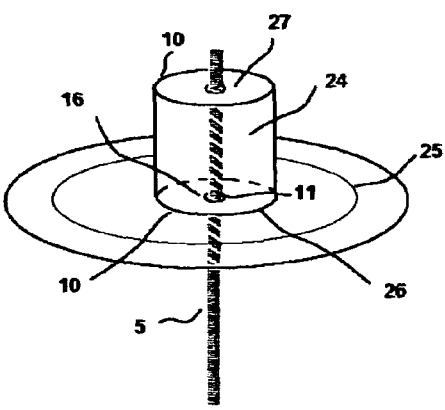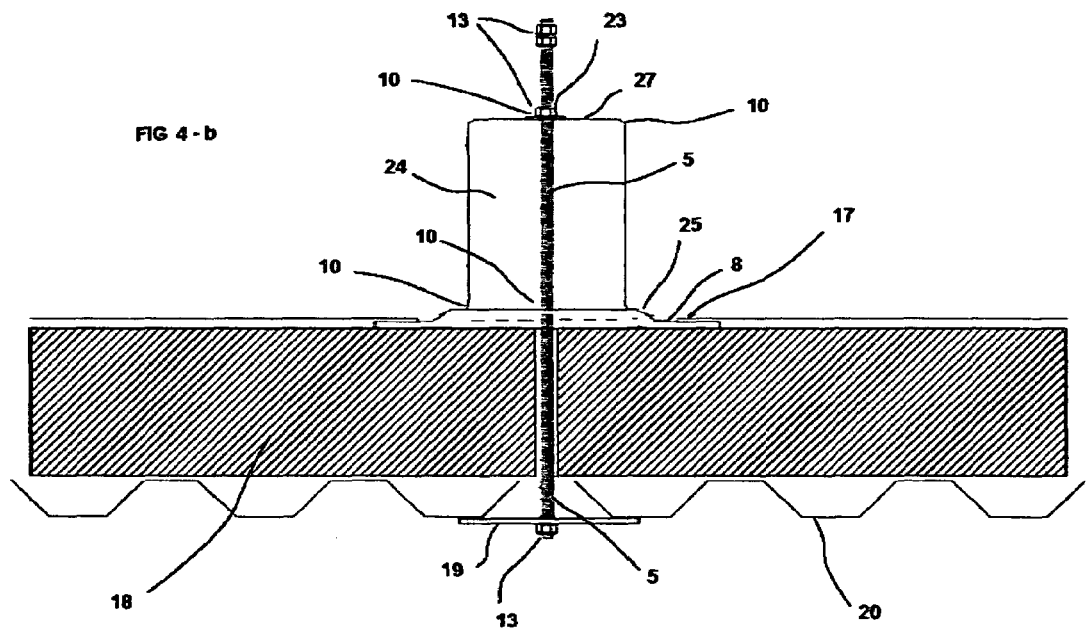

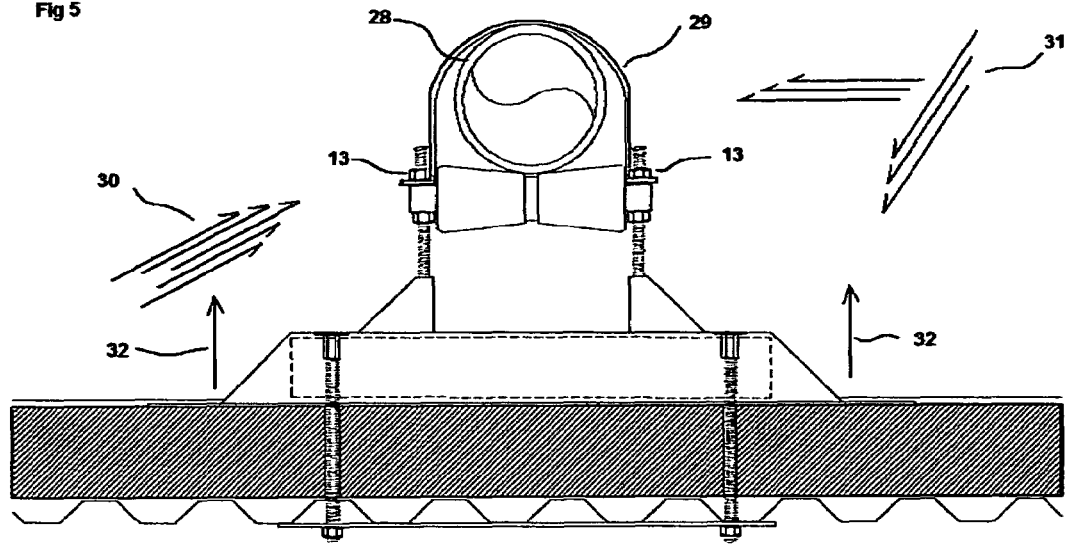
Fig 5
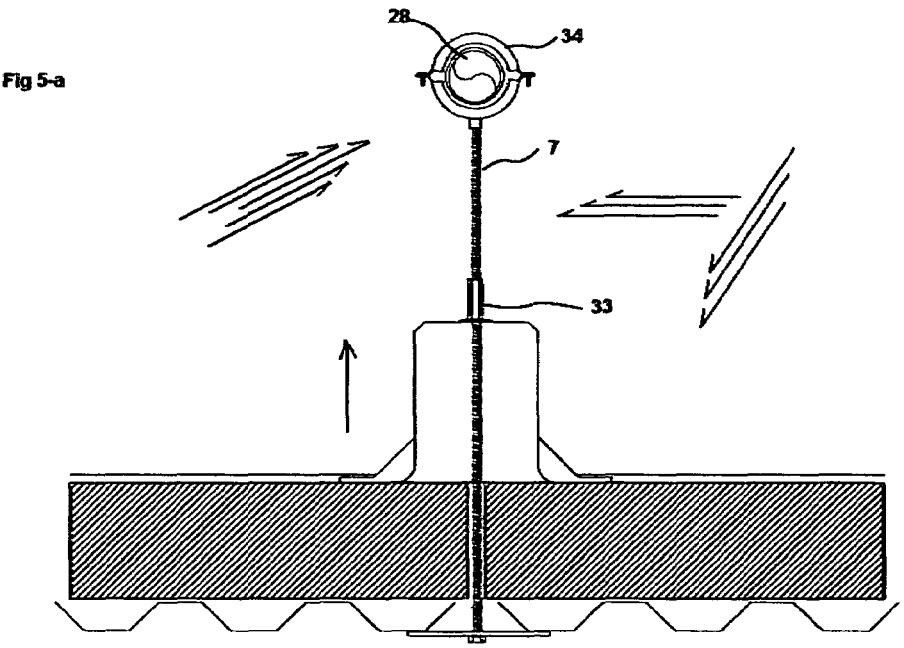
Fig 5-a

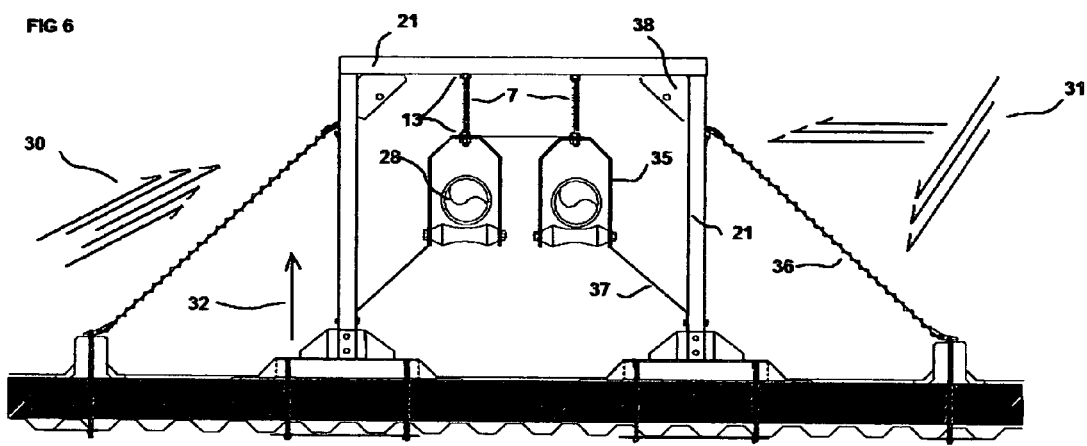
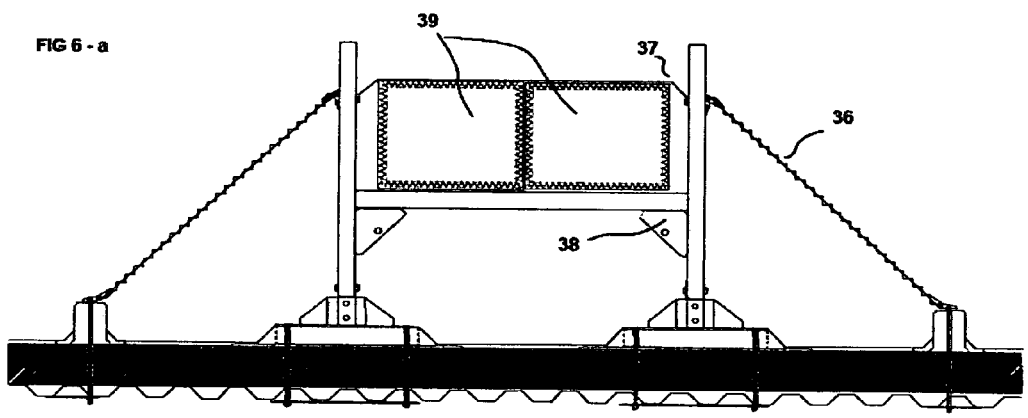

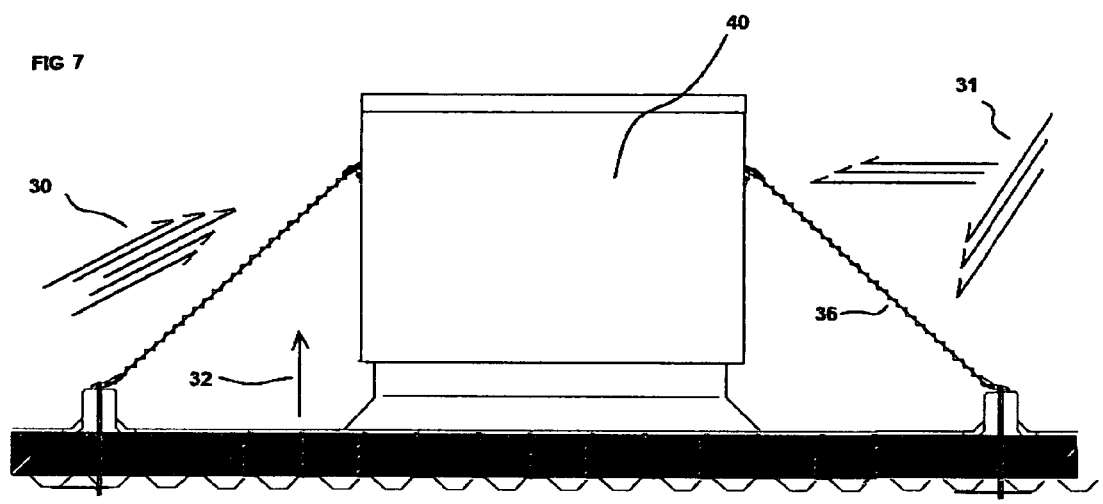
FIG 7
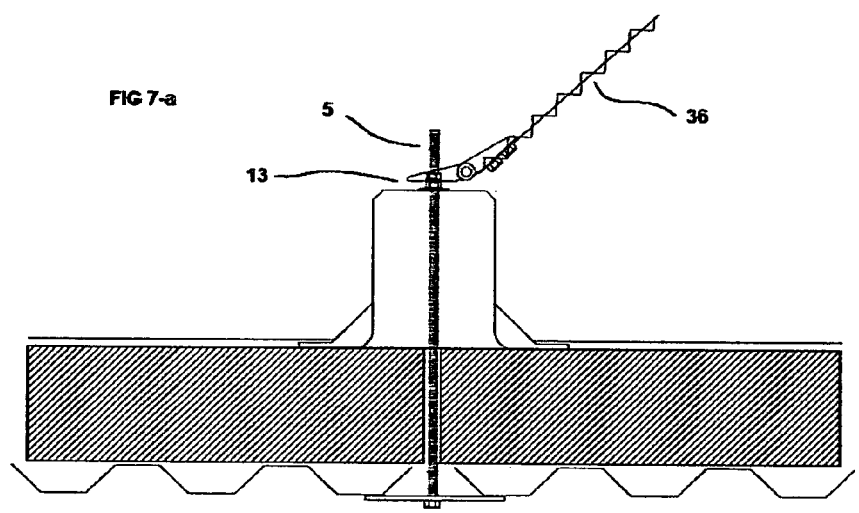
FIG 7-a

NON-PENETRATING SEISMIC ROOF SUPPORT

CROSS-REFERENCE TO RELATED APPLICATIONS

This application is entitled to the benefit of Provisional Patent Application No. 60/567,410, filed Apr. 29, 2004.

BACKGROUND

1. Field of Invention

This Invention is in the field of mechanical piping and equipment supports.

2. Background of the Invention

One of the original means to support piping and equipment atop a flat roof was the traditional treated or redwood block that was either loosely laid upon the roof surface or by use of a roofing mastic and sheet metal pitch pan flashed to the roofing membrane. In the evolution of methods and devices for this type of roof support, this accustomed method was virtually abandoned for a more practical method. The placement of roof piping onto a mechanical roller support that set loose onto the roof membrane was determined to be a superior means of support. There being less risk of roof damage due to penetration into the membrane either intentionally by the need to flash the support into the roof membrane or unintentionally through wear of the pipe on the support, this method was generally adopted in the roofing industry as superior to those previous.

Unfortunately, this technique did not take into account the need to secure the piping to the roof in order to prevent both the pipe and pipe support from becoming dislodged in the event of seismic shock or effects of high winds.

High wind forces associated with tornadoes, hurricanes, and even thunderstorms can dislodge piping and equipment located onto a building's roof, causing damage to not only the roof surface but also the building's structure. This piping and equipment becoming a projectile in the wind current can likewise cause damage or even injury in the areas surrounding the building affected by the high winds.

Seismic shock forces, having the potential to dislodge piping and equipment both internally as well as on top of a building structure could potentially lead to gas leaks in roof supported natural gas pipe systems and electrical shorts in electrical services located likewise atop a building's roof.

In response to these newly found concerns, many attempts were made to find a means of securing the loose-fit or free standing. Mastic or adhesive was applied to the underside of these supports wherein the support was in essence glued to the roof surface. This method proved unreliable and thus unacceptable.

Seismic cabling was affixed to the sides of the free standing support and then extended to the roof surface where this cable was then secured to the roofing. The need to secure and then flash this securing point proved to be as impractical as the original method of using a pitch pan to flash a device to the roof surface.

A method of providing for a structural, more secure means to affix the piping systems and equipment to a roof surface while avoiding the violation of the membrane seal of the roofing appeared to be the most logical solution to this dilemma.

SUMMARY

The invention is a method whereby roof located piping and equipment supports are affixed to a building's structure utilizing a means of flashing to the roof membrane so as to cause no damage to the roof surface.

The support is comprised of a flat surface whereby a roof installer has sufficient area in order to make a watertight seal of the support to the roof membrane. A solid platform extends above the flat surface where on various support mechanisms or devices for a variety of methods of supporting both piping and equipment can be utilized in accomplishing the intended purpose of the support.

Beneath the upper surface or platform of the support is located a series of securing devices that enables the support to be affixed to a building's structure members beneath the roof surface.

By incorporating a solid surface without penetrations, a support device, a means to make a moisture proof seal, along with a method of firmly affixing the support to the building structure, the invention incorporates all needed aspects of installation of roof mounted piping and equipment into a single all encompassing device.

DESCRIPTION OF THE DRAWINGS

FIG. 1 is a plane view of the support device.

FIG. 1-*a* is a top view of the support.

FIG. 2 is a plane view of an alternative embodiment of the support device.

FIG. 2-*a* is a top view of the alternate embodiment.

FIGS. 3 & 3-*a* are sectional views depicting the method of installation of the support device.

FIGS. 4, 4-*a* & 4.*b* are drawings of the single post style of the support.

FIGS. 5 & 5-*a* are examples of uses of the standard pipe support style of the device.

FIGS. 6 & 6-*a* are examples of uses of the strut assembly style of the device.

FIGS. 7 & 7-*a* are examples of uses to secure equipment to the roof surface.

NUMERAL IDENTIFICATION OF THE ITEMS ON THE DRAWINGS

| | |
|---|---|
| 1 | Formed Base |
| 2 | Sloping edge |
| 3 | Platform |
| 4 | Threaded rod insert |
| 5 | Structural support threaded rod |
| 6 | Rod support flange |
| 7 | Adjustment rod |
| 8 | Base flange |
| 9 | Reinforcing member |
| 10 | Continuous welded seam |
| 11 | Channel strut support |
| 12 | Structural angle member |
| 13 | Washer |
| 14 | Round cylinder |
| 15 | Offset flange |
| 16 | Welding location |
| 17 | Cylinder top |
| 18 | Piping |
| 19 | Pipe Strap |
| 20 | Wind shear force |
| 21 | Welding point |
| 22 | Mating structural flanges |
| 23 | Threaded nut |
| 24 | Support collar |
| 25 | Pipe roller |
| 26 | Round hole |
| 27 | Roofing membrane |
| 28 | Roofing insulation |

| | |
|---|---|
| 29 | Under-deck support flange |
| 30 | Roof decking |
| 31 | Seismic forces |
| 32 | Uplift forces |
| 33 | Threaded rod coupling |
| 34 | Pipe clamp |
| 35 | Pipe Hanger |
| 36 | Seismic Cabling Assembly |
| 37 | Seismic restraint |
| 38 | Angle bracket |
| 39 | Air conditioning ducting |
| 40 | Roof mount equipment |

DESCRIPTION OF THE INVENTION

The invented Non-penetrating Seismic Roof Support is a support device that has a formed base constructed of sheet metal. Stainless steel is ideal for construction of the support due to the weather resistive properties of this material. The flat metal is cut to a shape that permits it to be formed into the pattern illustrated in FIGS. 1 and 2.

By viewing FIGS. 1 and 1-a one can see that the formed base 1 is rectangular and shaped so that a lower base flange 8 extends outward on all sides of the device. This flange provides suitable area for a roofing installer to make a positive water-proof seam between the roof membrane and the support device. Sloping edge 2 prevents potential leakage between the base and the roof membrane that is commonly found when a right angle turn or form is made at a roof mounted device directly at the point where the device meets the flat roof surface.

As illustrated in FIG. 1-a, at each corner of the formed base, a continuous weld seam 10 will prevent moisture from penetrating the solid surface of the device. Atop the device, platform 3 is utilized in the design to provide a solid flat surface whereby piping and/or equipment support members can be affixed. In this embodiment of the invention to construct a standard pipe support, adjustment rods 7 are welded to rod support flanges 6 at welding points 11. The flanges are in turn affixed to the platform by means of welding. Atop these adjustment rods, a piping support device can be attached as shown in future drawings.

Continuing with FIGS. 1 and 1-a, threaded rod insert 4 is affixed to the underside of the formed base by means of welding. These inserts accept structural support rods 5. The purpose for these rods are discussed in later drawings. Also illustrated in FIG. 1 is reinforcing member 9. This member can be of various compositions. Wooden or composite blocks and structural steel channel or tubing will all serve the intended purpose of this reinforcing member by adding strength to the support device. By the insertion of this member into the cavity of the base, compression strength aids in preventing the possible deforming of the platform potentially caused by excessively loaded piping systems.

Now turning to FIGS. 2 and 2-a, another embodiment of the invention as a strut assembly support is illustrated. In these figures, the adjustment rods and support flanges are replaced by a pair of mating structural flanges 12. These flanges when first affixed by welding together then to the platform at weld points 11 will provide a cavity whereby a commonly used channel strut support can be secured in place thus providing a means to secure piping and equipment assemblies to the support. The opposing angle formed by the mating of the two opposing structural flanges and illustrated in FIG. 2-a provides for structural strength against sheer loads. Holes 16 are used in the securing of the channel strut and the application is described in future drawings.

FIGS. 3 and 3-a illustrate examples of pipe support devices utilized on the invented support. FIG. 3 shows a conventional pipe roller support that uses a pair of support collars 14 at each end of pipe roller 15. This assembly is affixed to adjustment rods 7 by means of threaded nuts 13 as shown. A threaded shaft adjoins the opposing collars and is not illustrated in the figure. FIG. 3-a shows how in lieu of a roller support that a common channel strut support 21 can be incorporated into the design. This strut is affixed to the adjustment rods by means of threaded nuts 13.

In FIGS. 3 and 3-a, a sectional view of a typical built-up roofing application, the method to affix the invented support to the structure and flash to the roof structure is illustrated. As shown, structural support threaded rods 5 pass first through reinforcing member 9 and then continuing into roofing insulation 18. Finally, these rods penetrate roof decking 20 and are thus secured to the underside structure of the roof by first inserting under-deck support flange 19 and lastly threaded nuts 13 onto each rod and tightening into place. This support flange is made of sheet steel that is sized to conform to the shape of the support device with holes matching locations of the structural threaded rods. As shown in FIG. 3-a, the support device is secured to the roof structure through a structural member such as the shown structural angle member 22. This member is positively affixed to other structural members, thus providing for additional structural integrity of the installation. As shown, the under-deck support flange is replaced in such instances with a conventional washer 23.

Once in place and as illustrated, the roofing installer is provided with a flat plane at base flange 8 whereby a seal at roofing membrane 17 can be moisture tight. This weather tight seal is of conventional methods established by the roofing industry.

FIGS. 4, 4-a, and 4-b illustrate another embodiment of the invented support device. This embodiment, a single post type, utilizes a round metal flange 8 instead of the rectangular shaped flange illustrated in previous drawings. Round cylinder 24 provides for extension above the roof surface of the platform herein referred to as cylinder top 27.

As illustrated in FIG. 4, structural support threaded rod 5 is welded onto cylinder top 27 at round hole 16. Next, this assembly is placed onto cylinder 24 and a continuous weld seam 10 affixes it into place. Then according to the figure, this assembly is inserted onto round base flange 8 with the support rod passing through the center hole 16. As shown in FIG. 4-a, this cylinder assembly is aligned with welding location 26 of the flange, then a continuous welding seam 10 and weld point 11 at the threaded rod secure the two pieces into position.

As shown in FIG. 4-b, an illustration of the assembly of this embodiment of the invention onto a flat roof, the support device is secured in a fashion similar to previously herein described methods except that the single support threaded rod 5 and a round under-deck support flange 19 are utilized to make positive the securing of the device to the structure. Also, as illustrated, because of the absence of a slope found in prior embodiments, a round offset flange 25 is pressed into the base flange to compensate for the lack of this sloping edge.

OPERATION AND USE OF THE INVENTION

FIGS. 5 and 5-a illustrate typical uses in standard pipe support applications of the invention. As shown in FIG. 5, pipe 28 is supported atop the support on a previously described roller assembly. Pipe strap 29, a conventional method of securing piping onto a support member, holds the pipe in place. This strap is affixed to the support by first removing the upper threaded nuts 13 from the roller assembly, and then inserting the holes commonly found on such strapping over the threaded adjustment rods. The nuts are reinserted and tightened once again onto the rods, thus securing the pipe into place atop the roller assembly. As illustrated by arrows representing wind shear force 30 and seismic forces 31, the pipe is prevented from becoming dislodged from the support by means of this affixed strap. The arrows representing uplift forces 32 fail to dislodge the entire assembly including the support device and piping because the device had been positively affixed to the building structure below the roof surface. Further, due to this positive attachment of the support assembly and because the device's ability to be moisture sealed to the roof membrane, damage to the roof surface at the point where the device comes into contact with the roofing materials has been prevented.

FIG. 5-a shows how a lighter duty piping system can be similarly secured in place by utilizing the single post style of the invention. In this example, threaded rod coupling 33 with added adjustment rod 7 enable the elevation of the pipe further above the roof surface. The pipe is affixed to the support by means of conventional pipe clamp 34. Like FIG. 5, it is demonstrated that the support assembly resists the wind and seismic forces because of the incorporated features.

As illustrated in FIGS. 6 and 6-a, the various embodiments of the invention can be utilized in unison to provide support for multiple runs of large piping and ducting systems. As shown in FIG. 6, two strut assembly support styles of the invention are used to create a strut structure above the roof surface. In this example channel strut supports 21 are framed together using angle brackets 38 and common nut and bolt assemblies. This assembly is attached to the support bases by means of bolting and nuts through the channel strut and through the holes previously noted in each of the base's mating structural flanges. This is a common means of constructing such a support structure except that it incorporates the invented support device. As shown, by using the strut assembly support style of the invention as bases for the strut assembly, a positive attachment with moisture proof features is achieved. The piping is then suspended downward from the cross member of the assembly using threaded adjustment rods, nuts and washers to attach a conventional pipe hanger 35.

Single post styles of the invented support are used at opposing sides of this assembly to aid in the restraint against wind and seismic forces. As shown, a seismic cabling assembly 36 attaches to the top of each single post, extending to the framework of the strut assembly. Attachment is accomplished by means of conventional bolt and nut arrangement. Within the assembly, seismic restraints 37 secure the piping assembly to the strut assembly. This two step approach to positively attach the piping and structural assembly gains the beneficial features of the invention by providing the positive attachment to the structure of the building and moisture tight seal of the roof, allowing the strut assembly to remain firmly in place while permitting the piping the advantage of sway that may arise due to the implied forces.

As in FIG. 6, FIG. 6-a demonstrates the combined use of the various embodiments of the invention. In this case, the example demonstrates that air conditioning ducting 39 can be similarly secured against wind or seismic forces by the use of a similarly constructed strut assembly with the duct being affixed to the strut by seismic restraints 37.

Moving the focus to equipment support and restrain, FIGS. 7 and 7-a illustrate an example of the use of the invention in such applications. Similar to the use of the single post style, in the previous example, these support devices serve as hold-down point for the shown equipment. Often high wind forces cause a roof mounted equipment 40 to become dislodged from its mounting. By providing added restraint with the single post, a more secured anchoring against such forces is achieved. In this example the seismic cabling assemblies 36 are affixed to the single post and then to a secured location on the surface of the equipment.

FIG. 7-a illustrates the method to affix this cabling to the single post. This enlarged detail shows that cabling 36 is bound to the support threaded rod 5 by means of threaded nut 13.

OBJECTS AND ADVANTAGES

From the description, the reader will see the advantages of my invention.

A) A platform for the purpose of securing piping or equipment onto a roof surface provided for absence of roof penetrations other than a single seam at the membrane.

B) A means to readily moisture seal the point of contact between the device and the adjoining roof membrane.

C) A means to secure the support device positively to the building structure.

CONCLUSIONS, RAMIFICATIONS, AND SCOPE OF THE INVENTION

As demonstrated in these descriptions and drawings, the essence of the invention is illustrated whereby the utilization of a single component all related aspects of the described installation are achieved. Thus the reader will see that the invented non-penetrating seismic support provides a practical method to secure and support a piping system while enabling a practical means whereby the support can be affixed to a building's roof structure and the contact point at the roof surface be made moisture resistant.

Although the description contains many specifications, these should not be construed as limiting the scope of the invention but as merely providing illustrations of the presently preferred embodiment of the invention. The many uses of the invention should not be limited by the example of use herein described. Thus the scope of the invention should be determined by the appended claims and their legal equivalents, rather than by the example given.

I claim:

1. A support and attaching device for mounting appratus to a roof comprising:

a base structure made of metal and comprising a base flange forming a perimeter of a selected area around said base structure, said base flange having a flat exterior lower surface for resting on a roof, and an elevated mounting platform having an area less than said perimeter of the selected area and spaced a selected distance above said base flange, said base flange and said elevated mounting platform connected together by a wall structure in a water tight manner;

at least one threaded rod attached to said elevated mounting platform and extending downward past said base flange and through said roof; and at least one mechanism extending above said elevated mounting platform for supporting and securing said apparatus to said roof.

2. The device of claim 1 wherein said threaded rod is secured to a structural support of said roof.

3. The device of claim 1 further comprising a reinforcing member located between said elevated mounting platform and said base flange and within said wall structure.

4. The device of claim 1 wherein said at least one mechanism comprises at least one threaded rod.

5. The device of claim 4 wherein a pipe support device is secured to said at least one threaded rod.

6. The device of claim 1 wherein said elevated mounting platform and said base flange are rectangular shaped.

7. The device of claim 5 wherein said elevated mounting platform and said base flange are rectangular shape, said at least one threaded rod comprises a pair of threaded rods and further comprising a pipe roller supported by said pair of threaded rods.

8. The device of claim 7 further comprising a pipe strap attached to said pair of threaded rods and extending over a pipe supported by said pipe roller.

9. The device of claim 5 wherein said at least one threaded rod extending downward through said roof comprises only one threaded rod and is also the mechanism extending above said elevated mounting platform.

10. device of claim 6 wherein said at least one mechanism comprises a pair of threaded rods and further comprising a channel strut attached to and extending between said pair of threaded rods.

11. The device of claim 6 wherein said at least one mechanism comprises a pair of structural members welded to said elevated mounting platform, said structural members forming a cavity for receiving another structural member.

12. The device of claim 1 further comprising weld seams to provide a water tight device.

13. The device of claim 1 wherein said at least two of said devices are combined to form a support assembly.

* * * * *